(12) United States Patent
Thompson

(10) Patent No.: US 7,857,017 B2
(45) Date of Patent: Dec. 28, 2010

(54) LAND CLEARING APPARATUS

(75) Inventor: Oliver Thompson, Louisville, KY (US)

(73) Assignee: Kodiak Kutters, LLC, Louisville, KY (US)

( * ) Notice: Subject to any disclaimer, the term of this patent is extended or adjusted under 35 U.S.C. 154(b) by 649 days.

(21) Appl. No.: 11/535,847

(22) Filed: Sep. 27, 2006

(65) Prior Publication Data
US 2008/0072997 A1 Mar. 27, 2008

(51) Int. Cl.
B27M 1/08 (2006.01)
(52) U.S. Cl. ....................................... 144/3.1
(58) Field of Classification Search .................. 144/4.1, 144/24.12; 180/53.3, 53.7, 53.8; 56/15.3, 56/16.9
See application file for complete search history.

(56) References Cited

U.S. PATENT DOCUMENTS

| 2,501,925 | A |   | 3/1950  | Yensen et al. |
| 2,961,830 | A | * | 11/1960 | Dundore et al. ............... 60/361 |
| 3,892,278 | A |   | 7/1975  | Smith et al. |
| 4,161,991 | A | * | 7/1979  | van der Lely .............. 180/53.7 |
| 4,236,554 | A |   | 12/1980 | Nicholson |
| 4,274,298 | A | * | 6/1981  | Ostrander .................... 74/467 |
| 4,355,670 | A |   | 10/1982 | Ohrberg et al. |
| 4,492,929 | A | * | 1/1985  | Vyne ......................... 330/253 |
| 4,535,859 | A | * | 8/1985  | van der Lely ................. 180/15 |
| 4,934,612 | A |   | 6/1990  | Johnson |
| 4,998,573 | A |   | 3/1991  | York |
| 5,419,380 | A |   | 5/1995  | Bot |
| 5,513,485 | A |   | 5/1996  | Hashimoto et al. |
| 5,641,129 | A |   | 6/1997  | Esposito et al. |
| 5,655,581 | A |   | 8/1997  | Craft |
| 5,667,330 | A | * | 9/1997  | Henkel et al. ............... 403/328 |
| 5,738,155 | A |   | 4/1998  | Cochran |
| 5,743,315 | A |   | 4/1998  | Esposito et al. |
| 5,829,497 | A |   | 11/1998 | Maroney |
| 5,901,911 | A |   | 5/1999  | Davis |
| 5,975,167 | A |   | 11/1999 | Brown |
| 6,021,825 | A |   | 2/2000  | Bowling |
| 6,047,749 | A |   | 4/2000  | Lamb |
| 6,134,494 | A | * | 10/2000 | Stelzle et al. ................. 701/50 |
| 6,263,930 | B1 |  | 7/2001  | Wiley |
| 6,659,378 | B2 |  | 12/2003 | Di Anna |
| 6,814,322 | B1 |  | 11/2004 | Slaby |
| 6,854,541 | B2 |  | 2/2005  | Matufuji et al. |
| 7,096,900 | B2 |  | 8/2006  | Schafer |
| 2004/0244869 | A1 | * | 12/2004 | Schafer ..................... 144/4.1 |
| 2006/0157153 | A1 |   | 7/2006  | Cochran |

OTHER PUBLICATIONS

Choosing the Right Loader. Website [online]. Bobcat Company, 2005 [retrieved on Apr. 30, 2009]/ Retrieved from the Internet: <URL: http://web.archive.org/web/20050204050229/www.bobcat.com/loader_compare.html>.*

* cited by examiner

Primary Examiner—Dana Ross
Assistant Examiner—Matthew G Katcoff
(74) Attorney, Agent, or Firm—James E. Cole; Middleton Reutlinger

(57) ABSTRACT

A deforestation apparatus includes a tractor having a power source, a torque converter connected to said power source and driving a power take-off shaft, a cutting implement operably coupled to said power take-off shaft, wherein said torque converter amplifies torque to the power take-off when the cutting implement decreases in angular velocity relative to the power source.

17 Claims, 11 Drawing Sheets

LAND CLEARING APPARATUS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates to a land clearing or deforestation apparatus and, more particularly, to a deforestation apparatus driven by the power take-off of a tractor or skid steer vehicle.

2. Description of the Related Art

A number of techniques are known for land clearing including the use of explosives, mechanical force by, for example, bulldozer, and also by comminuting or grinding vegetation to ground level and preferably below. Land clearing machines, also referred to as deforestation devices, are used to clear land for such things as utility and pipe line right-of-way, fire lanes, construction and development sites, recreational sites and the like. Some prior art forestry shredders have a plurality of cutting elements mounted near the periphery of a horizontal drum. In response to the rotation of the drum, the cutters engage and cut through trees, shrubs and other woody forestry debris. The shredded material is discharged and left as mulch.

The implements used for cutting trees and grinding away tree stumps are often hydraulically powered and may be mounted on a support vehicle, such as a skid steer loader. In normal use a skid steer loader has a loader bucket pivotally attached to and spanning between front lift arms. The loader bucket is used to move and disburse dirt, rocks and debris. In land clearing operations, the loader bucket of the skid steer loader may be removed and an auxiliary or alternate implement such as a cutting device is attached in its place. Such implements are commonly powered by a hydraulic motor of the skid steer loader's hydraulic power system.

Many of these cutting implements are connected to a rear end of a work vehicle such as a tractor and are pulled over the land to be cleared. Hydraulic motors are typically used to drive cutting implements which perform the land clearing function. One problem with such hydraulically driven systems is that as the power source moves to idle speeds, torque output by the hydraulic motor and cutting device decreases which impacts cutting ability of the implement as well as the recovery speed thereof. Moreover, other devices which utilize direct connection between the engine and cutting implement can stall the engine when bound while cutting large logs and trees.

SUMMARY OF THE INVENTION

The present invention allows for easy and efficient tree and brush clearing with a rotary cutting design. Further, the present invention will provide highly efficient mulching of the tree and brush vegetation being cleared.

It an object of the present invention to provide a machine for clearing land by felling trees and brush, and reducing them to chips or mulch.

It is another object of the present invention to provide a coupling configuration which connects at the cutting implement to a tractor or skid steer.

It is an additional object of the invention to provide a torque converter between the power source and the cutting implement such that the cutting implement is mechanically driven utilizing a fluid coupling.

It is a further object of the invention to provide a torque converter in the implement driveline to amplify torque.

It is still a further object of the invention to provide a torque converter in the implement driveline to provide faster recovery of the implement.

It is still an even further object of the present invention to provide a torque converter to minimize impact loading on the tractor power source.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

Figure 1:
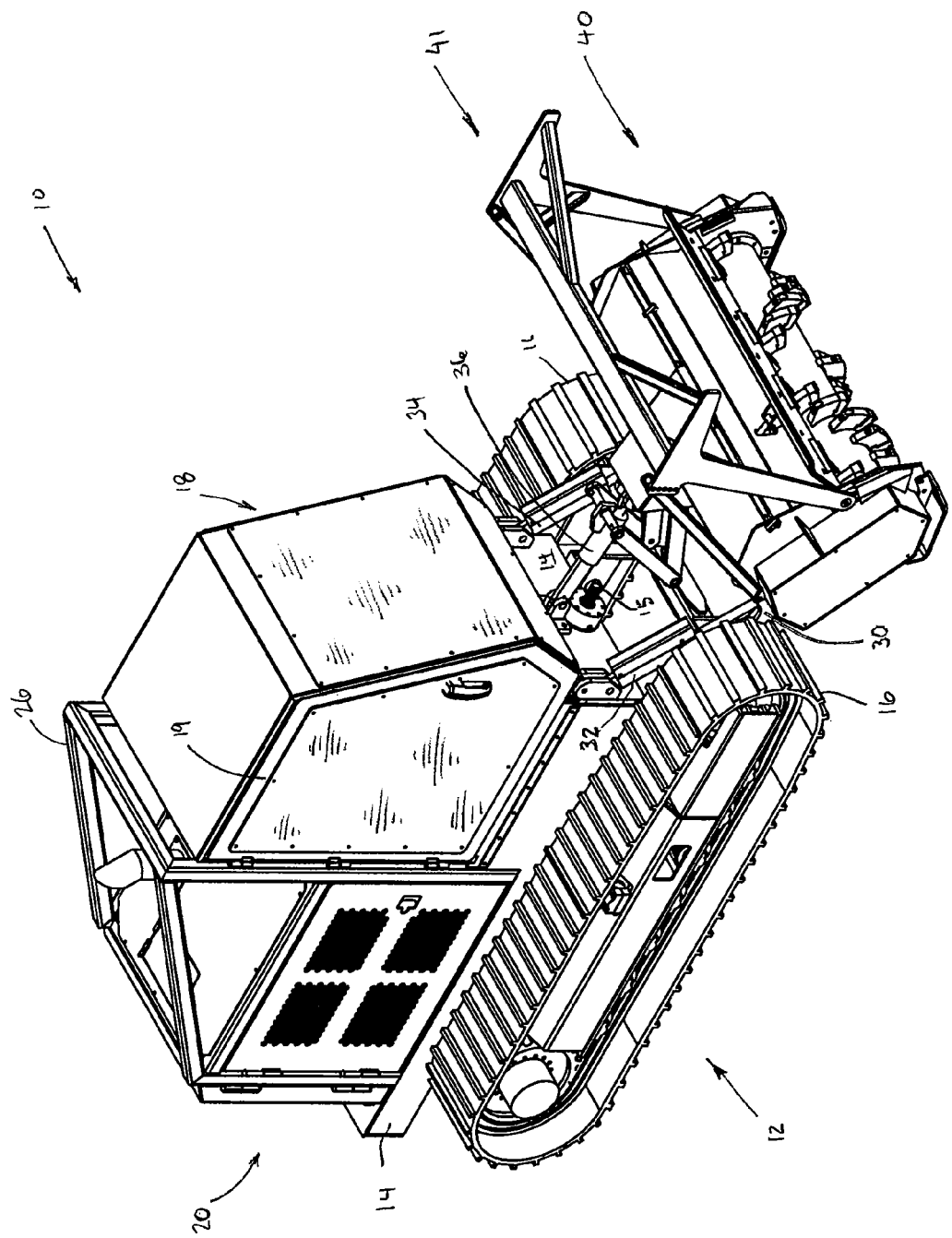
FIG. 1 depicts a perspective view of the land clearing or deforestation apparatus of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention and that other alternative mechanical configurations are possible.

For purposes of promoting understanding of the principles of the invention, reference will now be made to the embodiments illustrated and specific language will be used to describe the same. It will never the less be understood that no limitation of the scope of the invention is hereby intended, such alterations, modifications and further applications of the principles of the inventions being contemplated as would normally occur to one skilled in the art to which the invention relates.

The present invention includes a land clearing or deforestation apparatus utilizing a tractor, cutting implement and an operable driveline connection therebetween. The connection allows for amplification of torque from a power source within the tractor when the implement slows and until the implement speed recovers relative to the power source speed. Such amplification of torque helps the implement recover to full operating speed faster as well as inhibiting stall of the power source. The connection also minimizes impact load on the power take-off of the tractor, which drives the cutting implement.

Referring now to FIG. 1, the deforestation or land clearing machine 10 is depicted. The machine or apparatus 10 comprises a skid steer or tractor 12. The skid steer 12 is typical and includes a frame 14, and may be a wheeled skid steer or a track skid steer. The frame 14 may vary in size depending on the amount of land being cleared and the type of forestation thereon. In the exemplary embodiment the frame size may be a D5 undercarriage, as will be understood by one skilled in the art. Alternatively, the deforestation machine or device 10 may have a smaller frame size as desired by an end user. The frame 14 has a longitudinal length with a front end, where a cutting implement 40 is operably connected and a rear end where a winch or other equipment (not shown) may be disposed. Although specifically described throughout as a cutting implement, it should be understood that various driven implements may be utilized requiring high torque applications in combination with use of a tractor or skid steer power take-off.

In the exemplary depicted device 10, a track-type skid steer or tractor 12, also called a crawler, comprises first and second endless tracks 16 which each rotate about at least two axes. The two axes are generally perpendicular to the longitudinal axis of the frame 14 so that the rotation of the tracks 16 is generally in a direction parallel to the frame 14 therebetween. Alternatively, a plurality of wheels may be substituted for the tracks 16 in order to drive the tractor 12. In such an embodiment, high flotation tires may be utilized with such wheels in order to help prevent the equipment from sinking into soft ground and therefore reduce site impact. One skilled in the art will understand that the speed of the wheeled vehicles is generally greater than track vehicles, while the track vehicles distribute weight more evenly and cause less site damage. The present exemplary tractor 12 generally has two operating speeds: in high gear the machine 10 will travel at about seven miles per hour (7 mph) while in low gear the machine 10 will travel at about 2.5 miles per hour. This gearing may be adjusted to suit the land clearing needs of the end user, as will be understood by one skilled in the art.

The skid steer 12 comprises a cab 18 positioned on or above the frame 14. The cab 18 includes a seat and a plurality of control devices wherein an operator located in the operator position, or seat, controls movement of the skid steer 12 and working implements 40 attached thereto. The cab 18 may be equipped with heater and air-conditioning climate control as well as windows, which may be formed of, for example, Lexan. The cab 18 may comprise at least one door 19 for entry and exit thereto.

Adjacent the cab 18 and also disposed on the frame 14 is a power source, or engine compartment 20. A volume defined within the power source compartment 20 provides a location for a power source 60, described further herein. The present compartment 20 may include one or more doors 22 providing access for maintenance to the power source 60. The power source compartment 20 may also comprise a plurality of vents for cooling and air intake by the power source 60.

The tractor 12 may further comprise a roll bar 26 which supports the tractor 12 in case of a rollover condition to protect the operator within the cab as well as the power source compartment 20. The frame 14, cab 18, power source compartment 20 and roll bar 26 may be formed of various rigid, high strength materials, such as steel, aluminum, or the like. The roll bar 26 may be formed of round or square tubing of suitable gauge for the desired protection. The frame 14 may be formed of tubing, channel, or other known structural shapes of a suitable material available to one skilled in the art.

Figure 2:
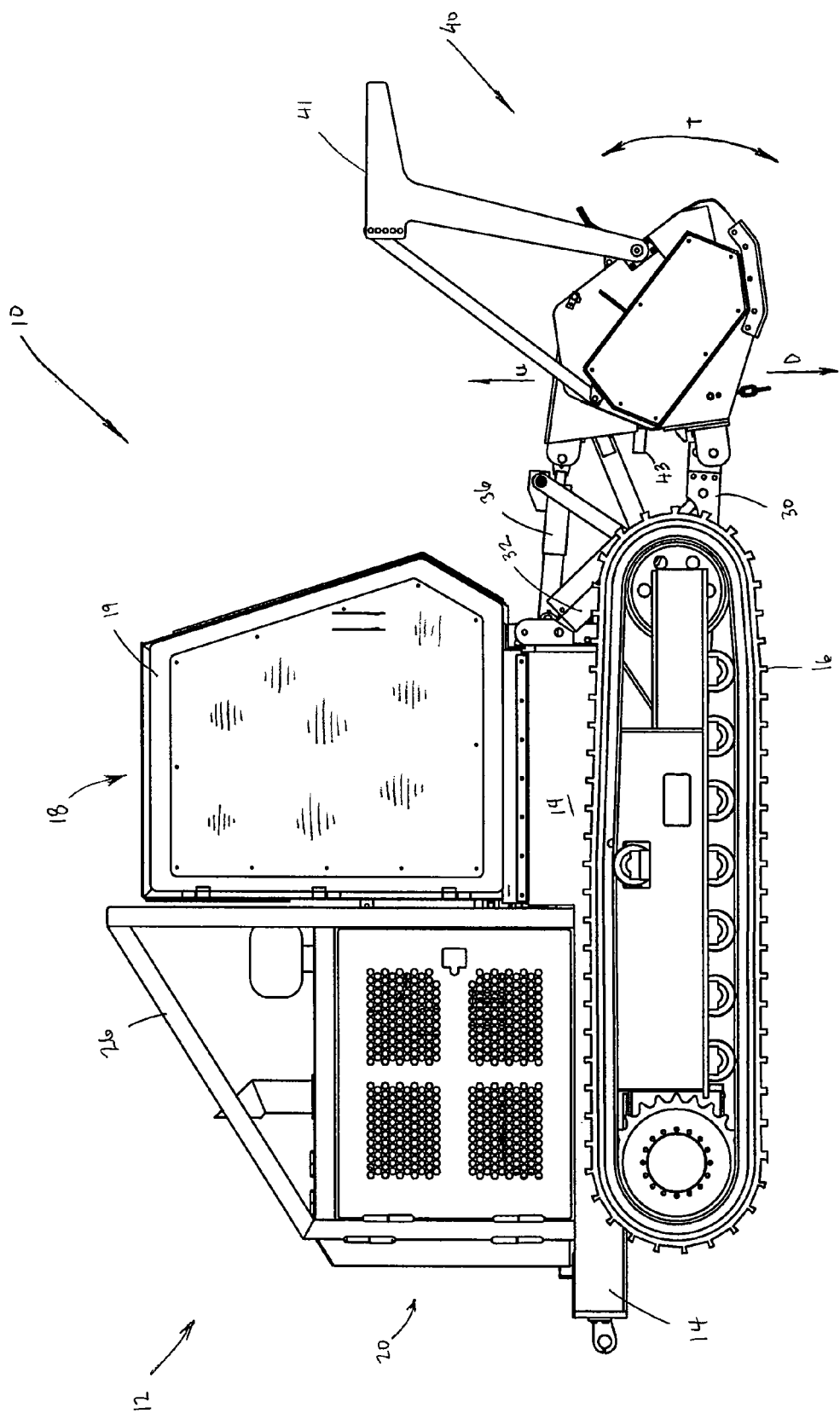
FIG. 2 depicts a side view of the land clearing apparatus of FIG. 1.

Referring to FIG. 2, a side view of the deforestation machine 10 is depicted. Extending from a forward longitudinal end of the frame 14 are opposed arms 30 which provide a rigid connection between the frame 14 and a cutting implement 40. The tractor 12 and cutting implement 40 also utilize a three point hitch system allowing raising and lowering, as well as tilting, of the cutting implement 40. The raising and lower are indicated by up arrow "U" and down arrow "D". The cutting implement may also tilt about a horizontal axis and such movement is indicated by arrow "T". The three point hitch system is defined by three hydraulic cylinders. First and second cylinder assemblies 32, 34 (FIG. 1) provide the raising an lowering function by connecting at a first end to the tractor 12 and at a second end to the arms 30 connected to the cutting implement 40. A third hydraulic cylinder assembly 36 provides the tilting motion. The cylinder 36 extends from the tractor 12 to an upper area of the cutting implement 40 to provide the tilting pivot. The travel distance of the implement 40 in the directions indicated may be adjusted by the length and travel of cylinder assemblies 32, 34, 36.

Also extending between the frame 14 and the cutting implement 40 is a universal jointed drive shaft (not shown for clarity) which transmits power from the power take-off 15 to the cutting implement 40. Since the cutting implement 40 moves relative to the tractor power take-off, universal joints may be utilized at each end of the drive shaft extending from the tractor power take-off 15 to the input 43 of the cutting implement 40.

Figure 3:
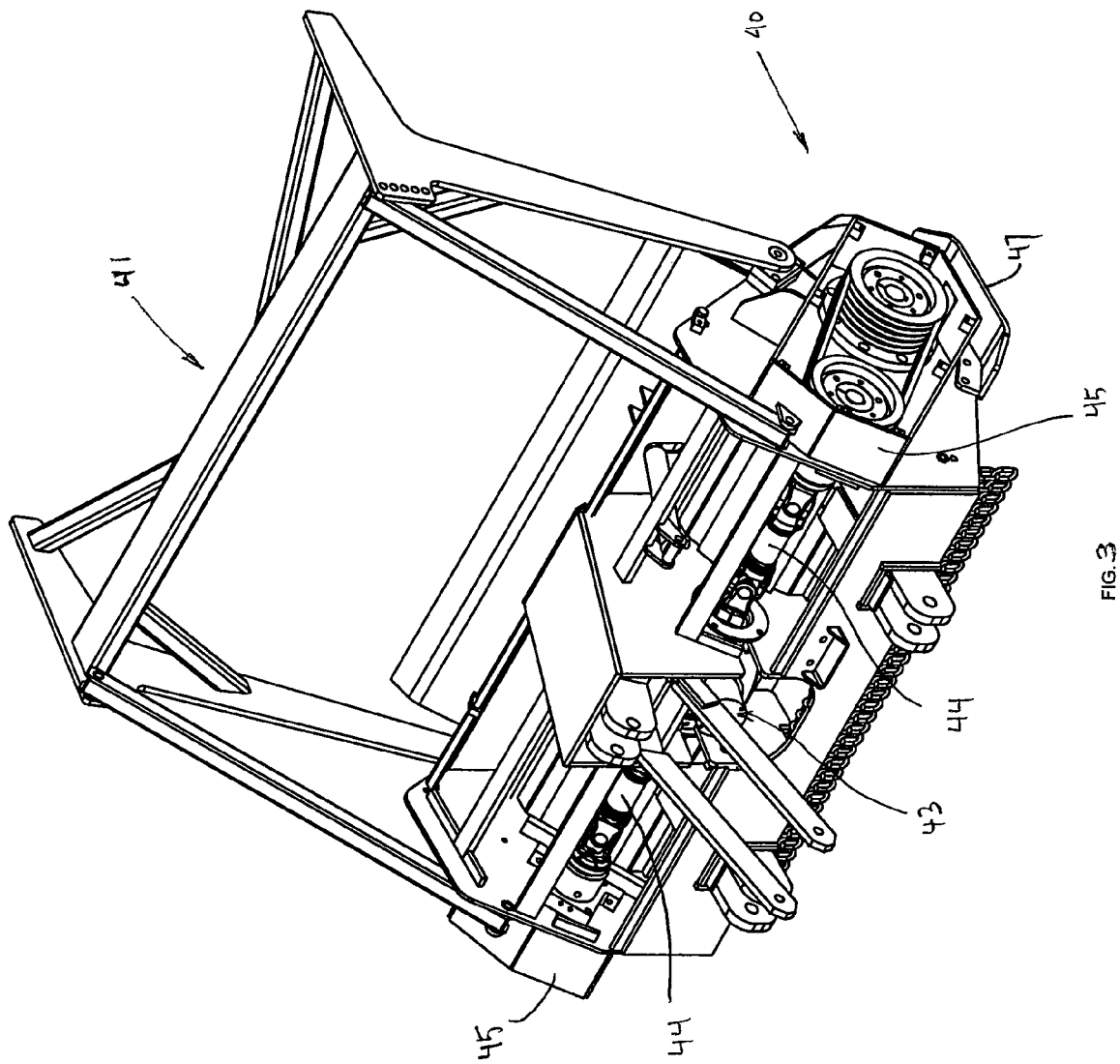
FIG. 3 depicts a front perspective view of the cutting implement of FIG. 1.
Figure 4:
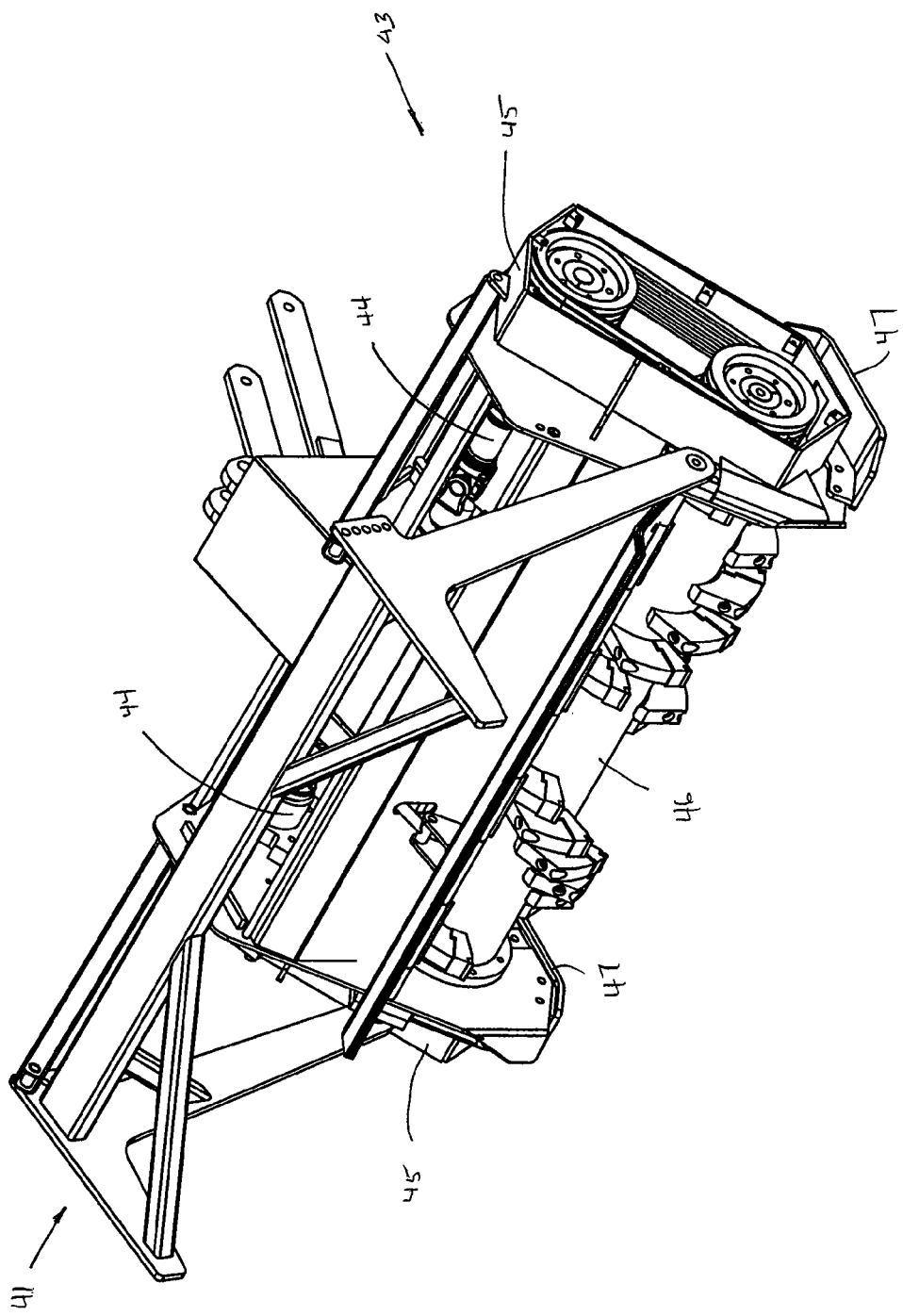
FIG. 4 depicts a rear perspective view of the cutting implement of FIG. 2.

Referring now to FIGS. 3 and 4, perspective views of the cutting implement 40 is depicted. The cutting implement 40 comprises a pusher assembly 41 which is formed of a truss-like structure and extends from the upper portion of the cutting implement 40. The pusher assembly 41 engages a tree and applies force thereto when the cutting implement 40 is cutting the trunk of the tree. By applying force to the tree, the tree falls away from the machine 10. The cutting implement 40 also comprises an input 43 (FIGS. 2, 3) which is operably connected to first and second cutter drive shafts 44. The connection between the input 43 and drive shafts 44 may be accomplished by bevel gears which allow for the transmission to turn 90 degrees. The cutter drive shafts 44 extend at about 90 degrees from the input 43 between the input 43 and a transmission housing 45 wherein belt and pulley configurations are located. Specifically, the upper pulleys are connected to the cutter drive shafts 44 and the lower pulleys are connected to the cutter 46. As the lower pulleys rotate, the cutter 46 rotates. The cutter 46 of the exemplary embodiment includes a cylindrical shaft having a plurality of teeth extending therefrom. Various cutting tooth arrangements may be utilized in accordance with the present invention depending on the material which will be utilized. The cutting implement 40 may further comprise a skid 47 located along the bottom sides spaced from the cutter 46 to aid motion of the cutting implement across vegetation.

Figure 5:
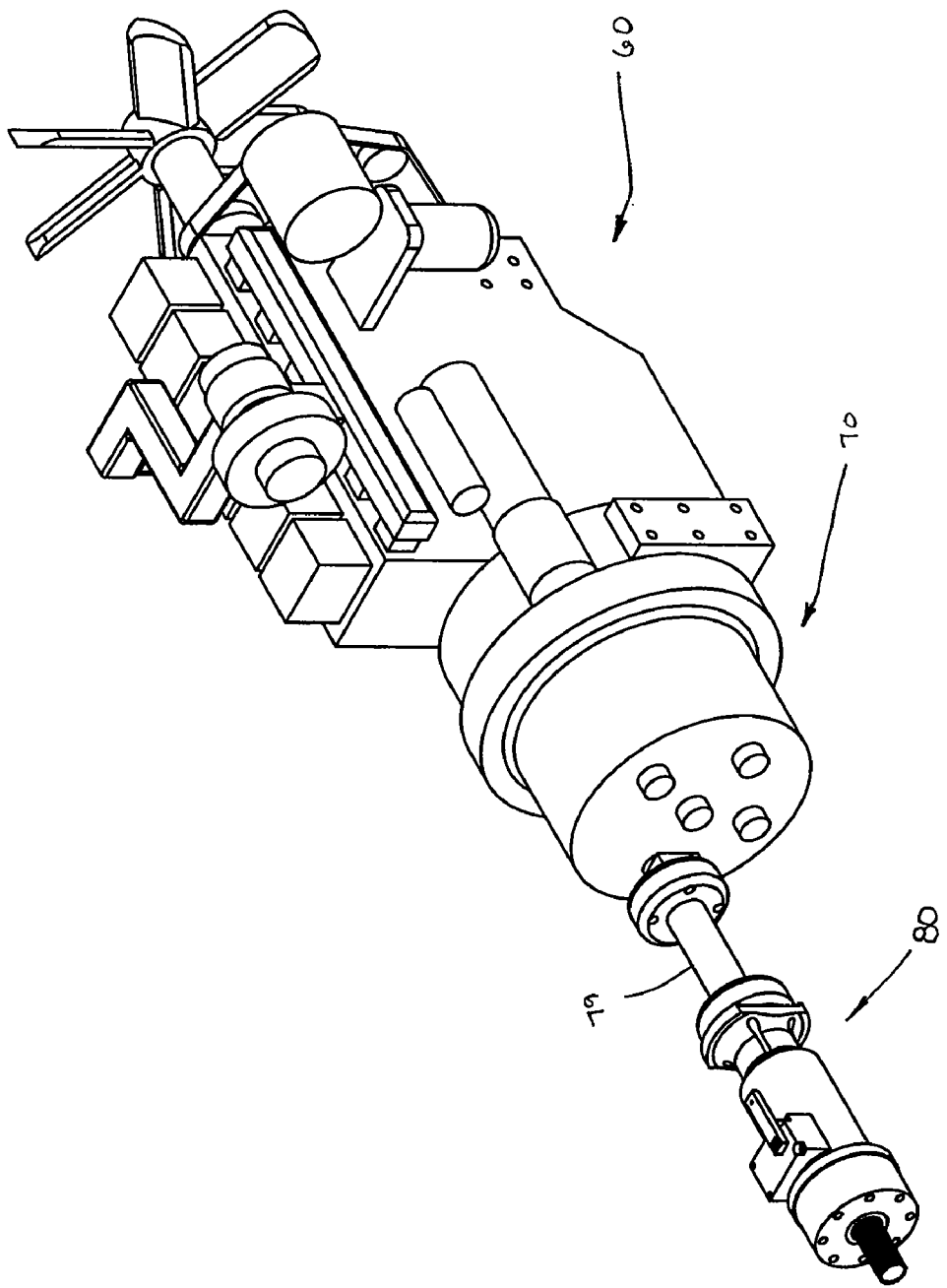
FIG. 5 depicts a perspective view of the cutting implement drive train of the land clearing apparatus of FIG. 1.

Referring now to FIG. 5, a perspective view of the cutting implement drive train is depicted. At one end of the drive train is a power source 60. The illustrative and exemplary power source 60 may be a combustion type engine such as a gasoline or diesel powered engine. According to one exemplary embodiment, the power source 60 may be a Caterpillar® C12 diesel powered engine having six cylinders. The exemplary power source 60 may have 732 cubic inches of displacement and produces 425 gross Horsepower at 1800 RPM. The maximum rated torque is 1350 pounds-feet (lb-ft) at 1450 RPM. Although these exemplary specifications are provided, one skilled in the art will realize various engine sizes and/or models have utilized and substituted for the exemplary engine provided herein depending on the required horsepower and torque and therefore should not be considered limiting. A torque converter 70 is connected to the power source 60 at the engine flywheel. The torque converter 70 provides a fluid connection between the power source 60 and the output assembly 80. The output assembly 80 is operably connected to the cutting implement 40 by the driveshaft and universal joints previously described.

The fluid connection provided by the torque converter 70 provides several advantages over prior art devices which are either rigidly connected by the clutch/coupling combinations or operated by hydraulic motors. For example, the fluid connection of the torque converter 70 provides protection to the power source 60 when large objects such as large diameters trees are encountered which would typically bind a cutter and stall the power source 60. In addition, the torque converter 70 provides torque amplification at the cutting implement 40 when material is ground and chipped therein as the cutter slows relative to engine speed. Further, the amplification of torque via the torque converter 70 allows for faster recovery of the cutting implement 40 to operating speed due to the increased torque when the cutting implement 40 slows its rotational speed relative to the power source 60.

Figure 6:
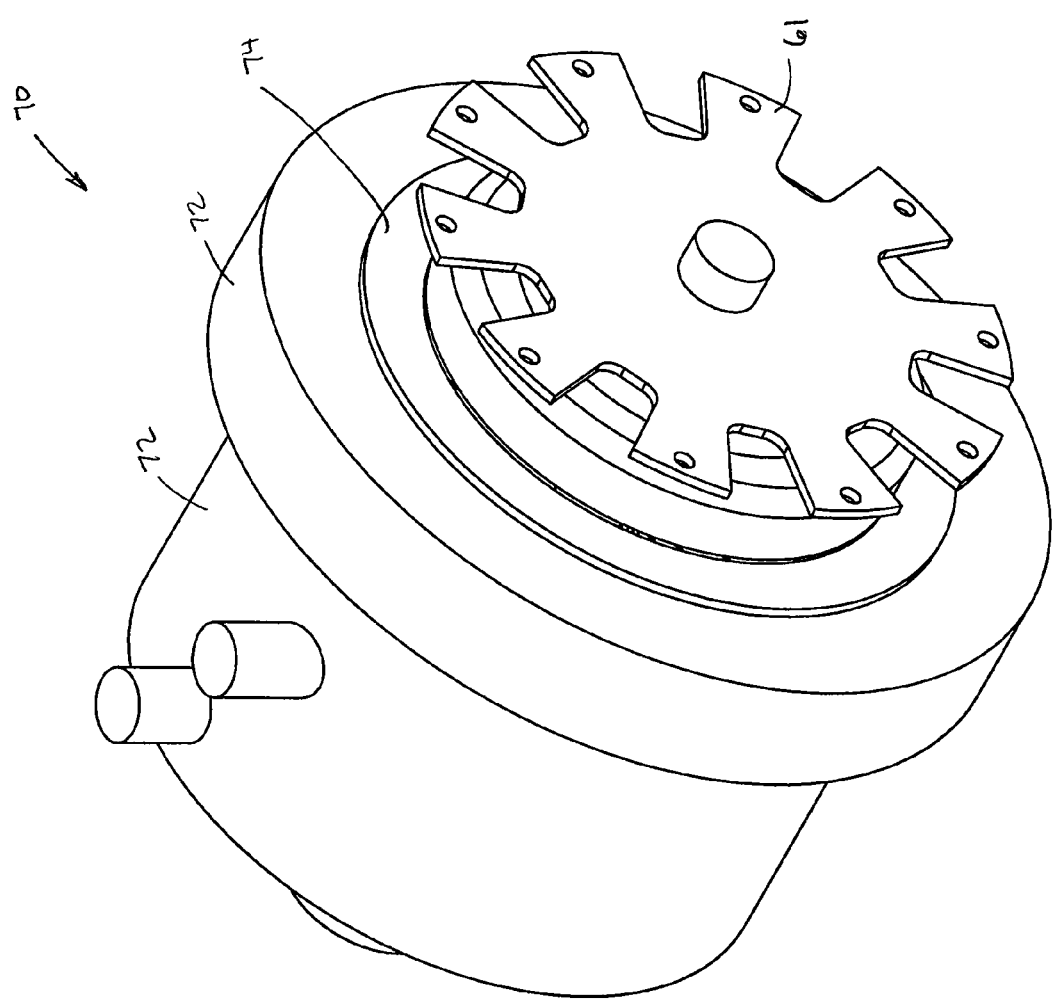
FIG. 6 depicts a rear perspective view of a torque converter.

Referring now to FIG. 6, a front perspective view of the torque converter 70 is shown. The torque converter 70 has a housing 72, wherein a pump 74, a turbine 78 and a stator 63 (FIG. 8) are operably housed. At a rear end of the torque converter 70, a flex-plate 61 is connected to the pump 74. The flex-plate 61 is rigidly connected by a plurality of bolts to a flywheel on the power source 60 so that the pump 74 rotates at the engine speed of the power source 60. The flex plate 61 is generally circular in shape with a plurality of wings extending radially but may comprise various shapes which cooperatively engage the flywheel (not shown) of the power source 60. Further, the flex-plate 61 may be rigid, or somewhat flexible in construction and therefore may be comprise of various materials, such as spring steel.

Figure 7:
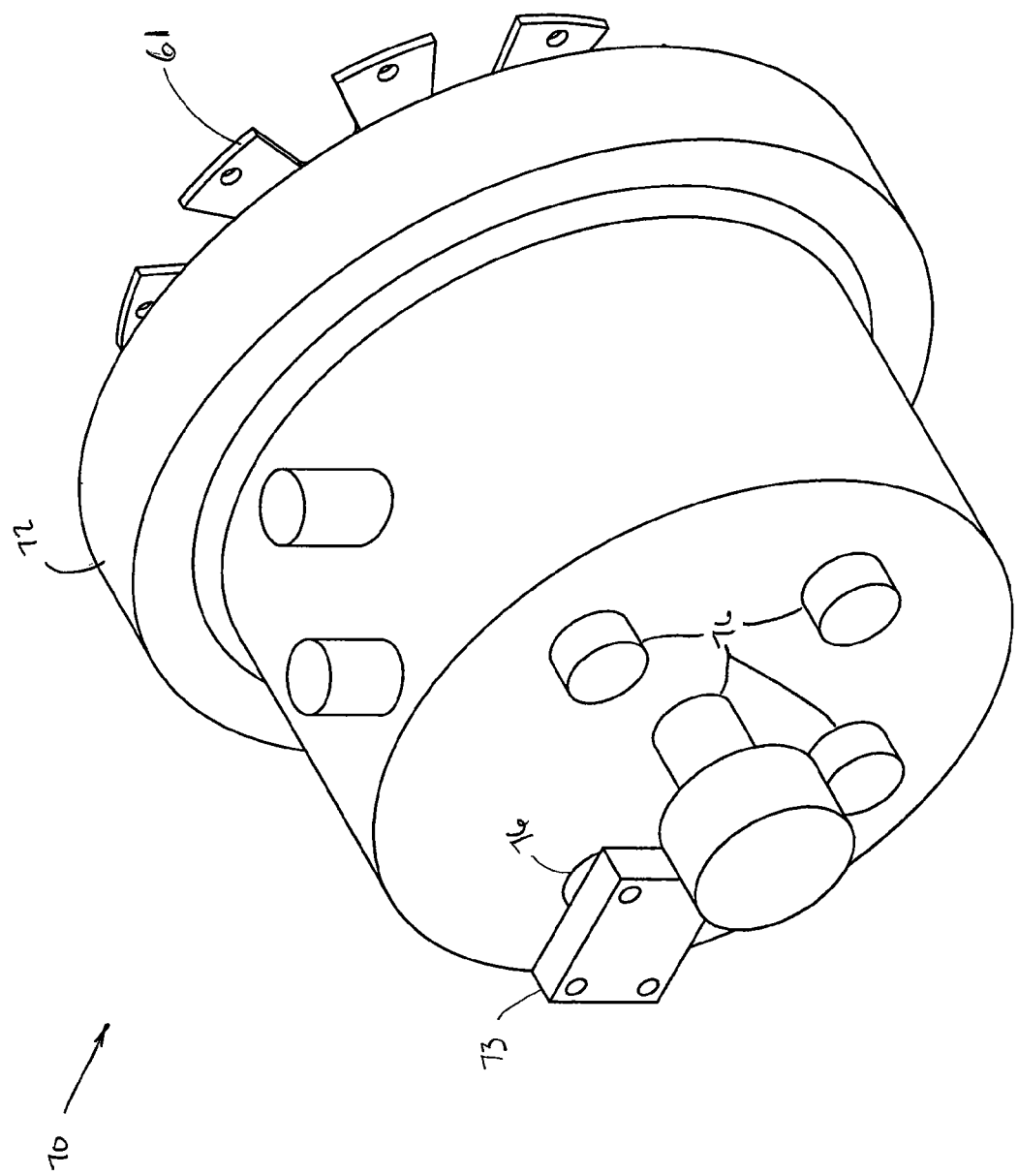
FIG. 7 depicts a front perspective view of the torque converter.

Referring now to FIG. 7, a front perspective view of the torque converter 70 is depicted. At a forward end of the housing 72, a plurality of mechanical outputs 76 are provided. From the top moving clockwise, the first three outputs are utilized in connection with pumps (not shown) for driving the tracks 16 as well as the hydraulic cylinders 32, 34, 36 of the three point hitch system. A central output 76 may be used to rotate an output shaft, such as an inner PTO shaft 79 (FIG. 5), in the same direction as the turbine 78. Alternatively, the output 76 to the left of the central output is offset from and connected to the central output by a gear to provide an opposite rotation from the output of the central output 76. As shown in FIG. 7, the left most output 76 is utilized having a torque converter output shaft 73 for connection to the inner PTO shaft 79. The output shaft 73 is therefore offset from the alternate outputs 76 and pumps connected thereto (not shown).

As previously indicated, the torque converter 70 provides a fluid coupling between various components along the driveline of the cutting implement 40. The torque converter 70 allows the power source 60 to operate at a different speed than the cutting implement 40. In return for the reduction in efficiency of the fluid coupling, the torque output from the torque converter 70 is amplified which provides various advantages during use of the cutting implement 40 not found in prior art devices. As the power source 60 and the torque converter 70 operate closer to the same speed, the efficiency increases and torque is transferred at nearly a 1:1 ratio. The torque converter 70 also smoothes out engine pulses as well as speed drops due to the cutting implement 40 encountering large objects such as larger diameter trees. When the speed of the cutting implement 40 decreases due to cutting of such object, the torque increases providing faster recovery times for the cutting implement 40 to return to engine speed. The torque converter 70 also inhibits stalling of the power source 60 due to the fluid coupling provided therein.

Figure 8:
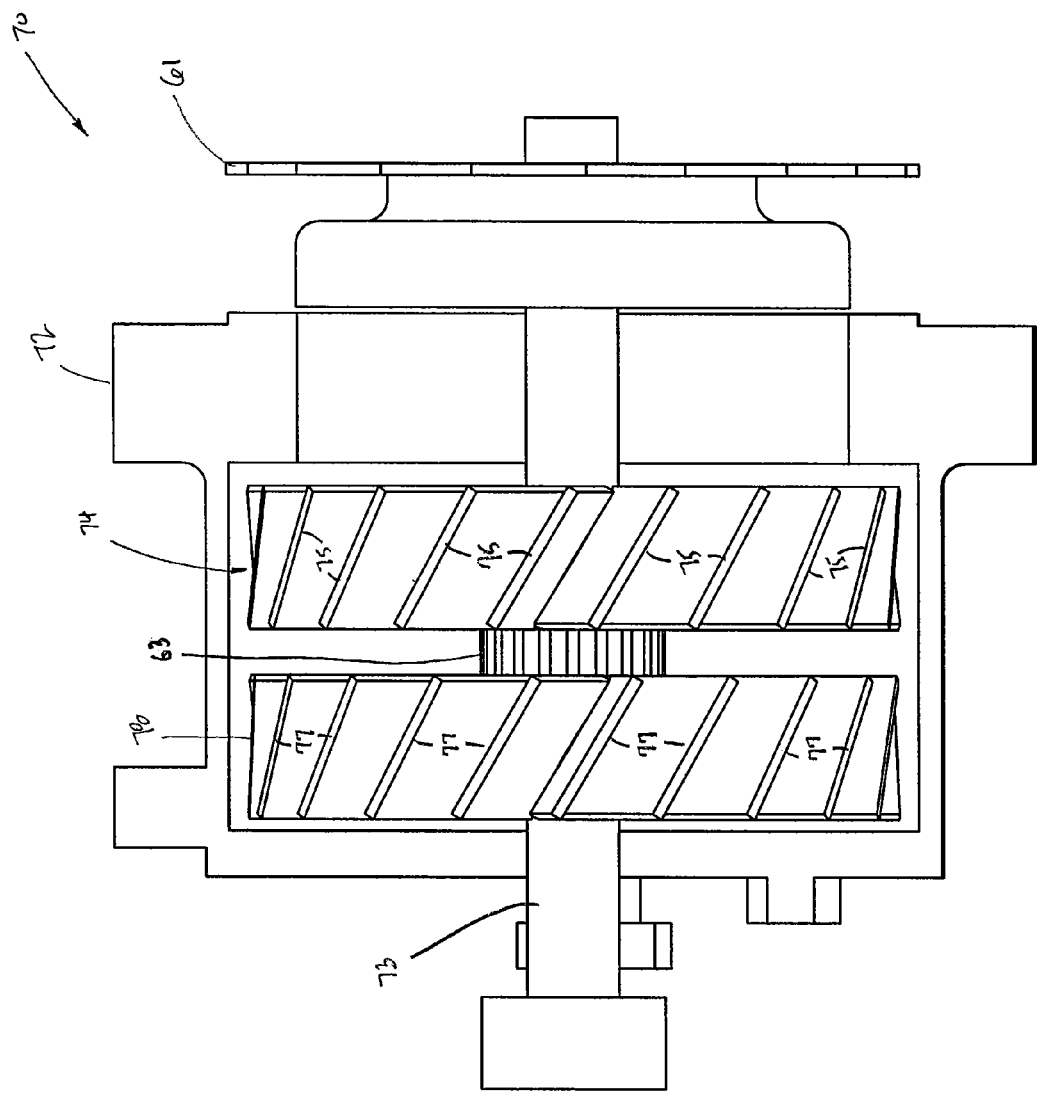
FIG. 8 depicts a schematic sectional view of the torque converter of FIGS. 6 and 7.
Figure 9:
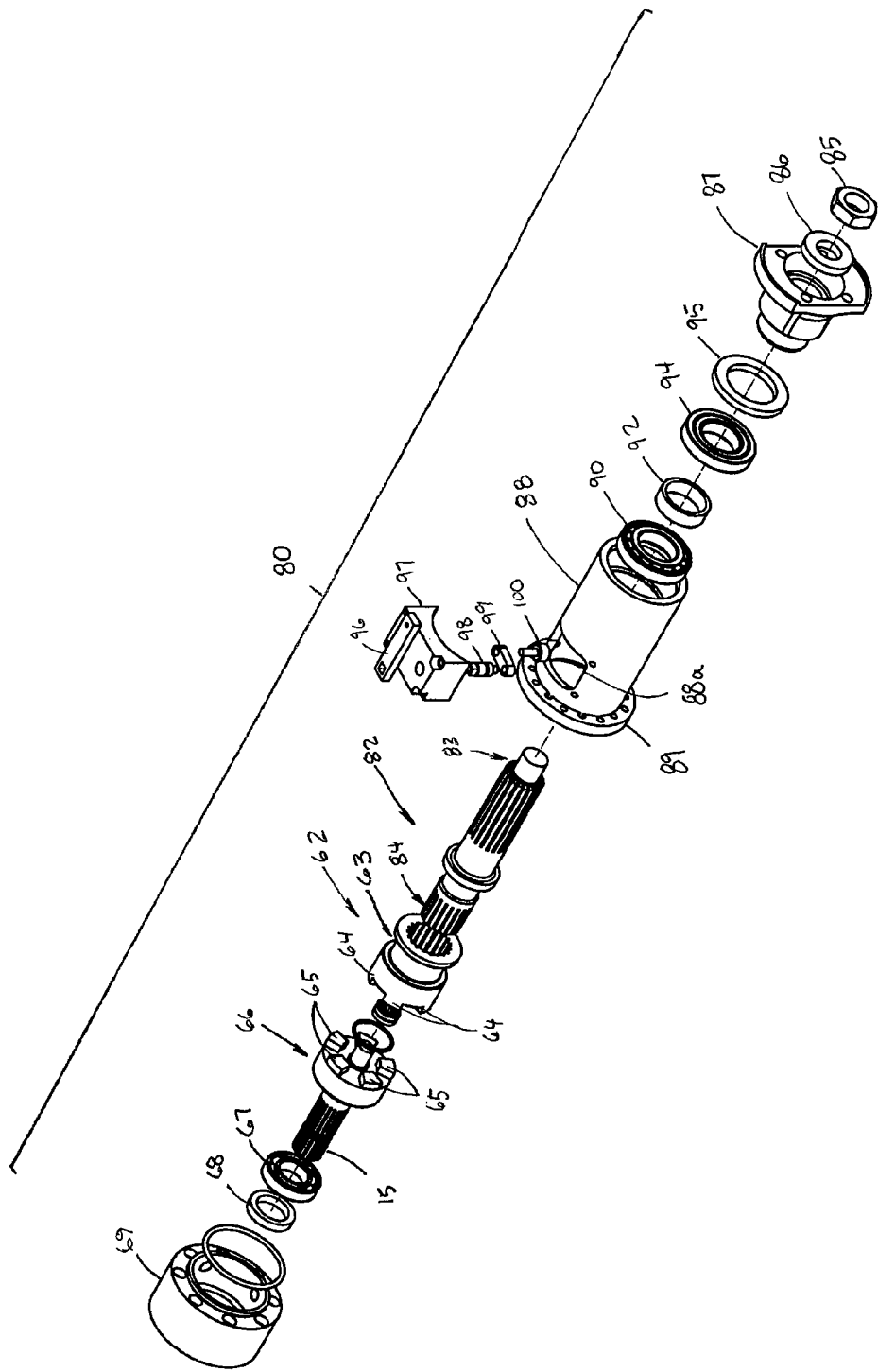
FIG. 9 depicts an exploded view of a power-take off output assembly.
Figure 11:
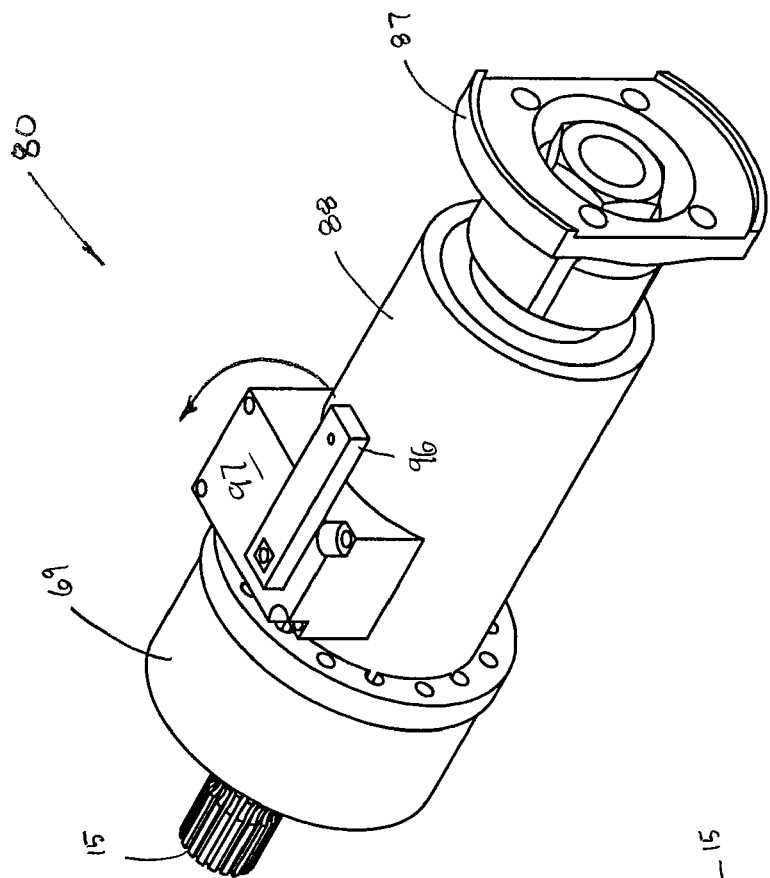
FIG. 11 depicts a rear perspective view of the power take-off assembly of FIG. 9.
Figure 10:
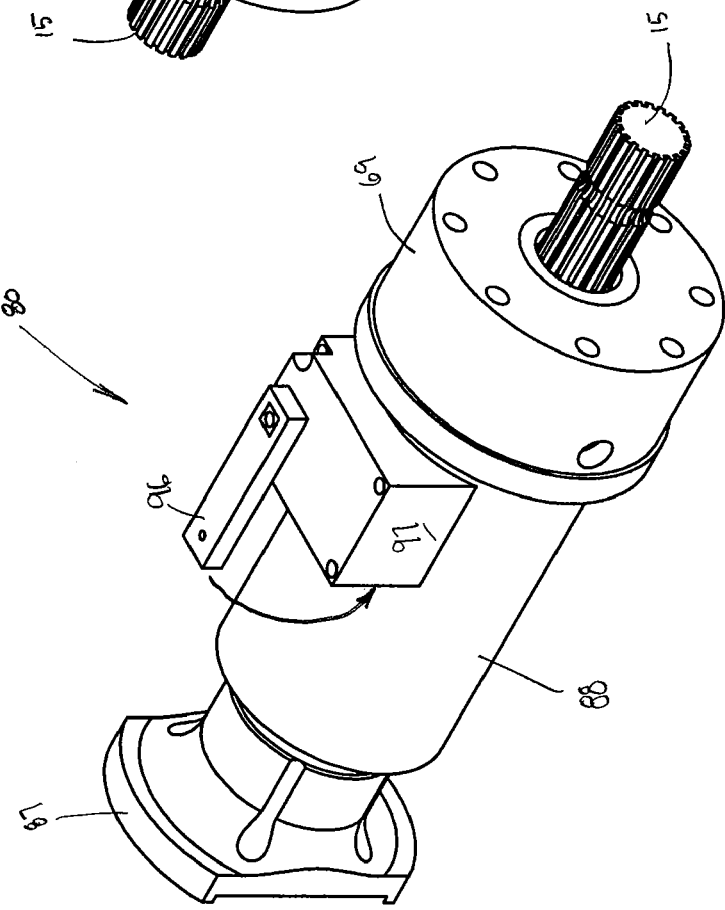
FIG. 10 depicts a front perspective view of the power take-off assembly of FIG. 9.
Figure 12:
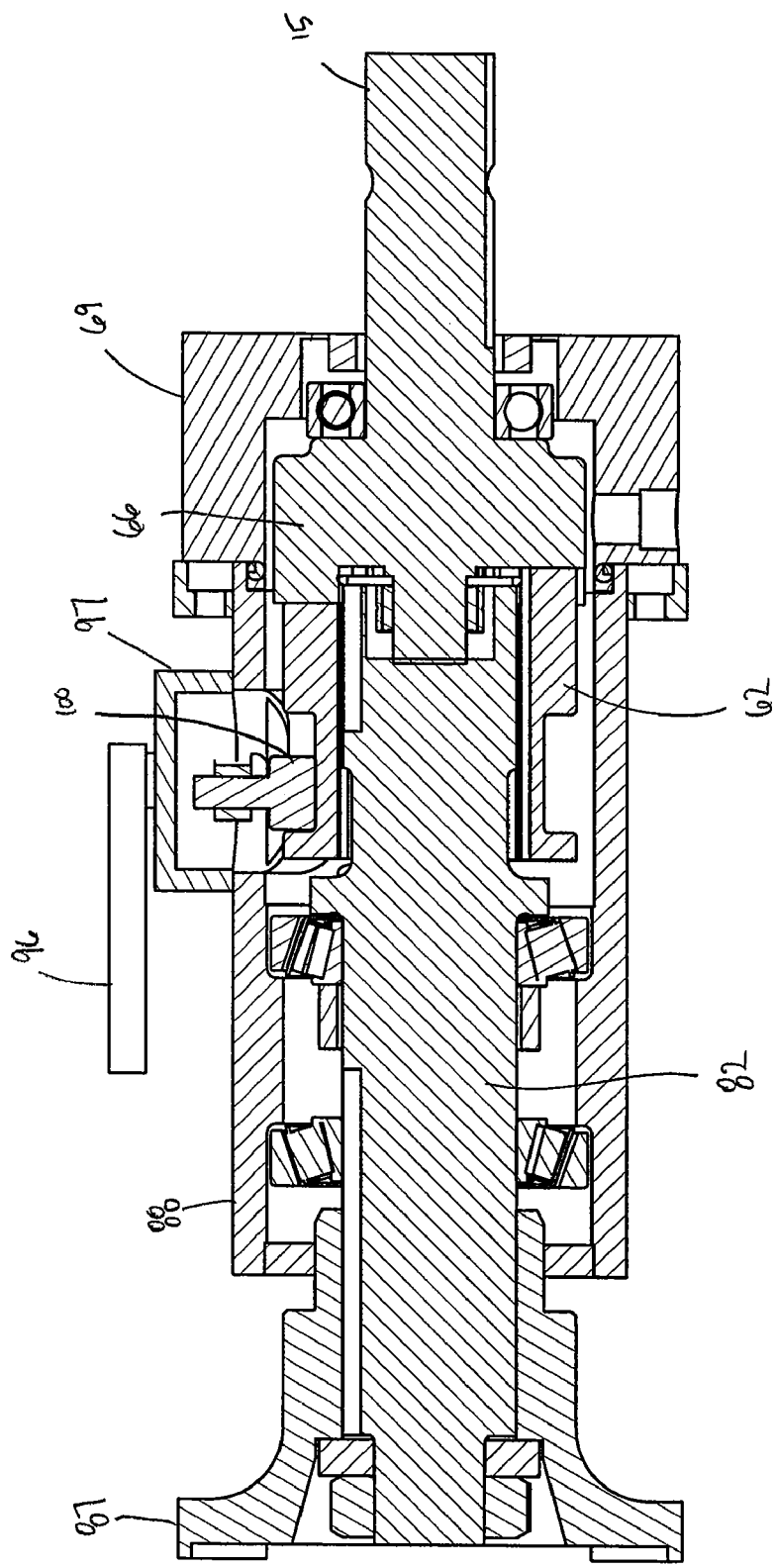
FIG. 12 depicts a side-sectional view of the power take-off assembly of FIG. 9.

Referring now to FIG. 8, a schematic sectional view of the torque converter is depicted. Within the housing 72, the torque converter 70 comprises a pump or impeller 74, a turbine 78 and a stator 63. The pump 74 has a plurality of blades 75 radially extending therefrom. Opposite the pump 74 is a turbine 78 also having a plurality of blades 77. Disposed between the pump 74 and the turbine 78 is a stator 63. The blades 75, 77 of the pump 74 and turbine 78 are generally radially extending but characteristics of the blades 75, 77 may be changed to vary the performance characteristics of the torque converter 70. For example varying the curvature and/or angle of the pump and turbine blades 75, 77 may vary the amplification of torque, which is desirable.

The pump 74 may be various shapes. The exemplary pump 74 is generally circular in shape and symmetrical about a central shift axis with a plurality of blades 75 extending from the pump. The blades are curved to provide the desired function. An aperture (not shown) in the central portion of the pump 74 functions as a fluid intake during operation so that hydraulic fluid is input through the aperture and directed radially outward along the blades 75. The flex plate 61 is connected to the flywheel of the power source 60, so that the flex plate 61 and pump 74 rotate at the same speed as the power source 60. As the blades 75 of pump 74 rotate at the speed of the power source 60, fluid is directed radially outward. As the pump 74 rotates, hydraulic fluid is directed from the central portion of the pump 74 radially outward along the blades 75 toward the turbine 78. As the hydraulic fluid is directed outward along the blades 75, a vacuum is created near the central portion of the pump 74 to draw additional fluid into the torque converter 70.

Like the pump 74, the turbine 78 is generally circular in shape with a plurality of blades 77 extending radially therein. The turbine 78 is connected to the output assembly 80 by the inner power take-off shaft 79, which is connected mechanically downstream to the cutting implement 40. When the housing 72 is not filled with hydraulic fluid, the pump 74 may rotate independently of the turbine 78. However, when the housing 72 is filled with hydraulic fluid the fluid coupling of the torque converter 70 allows operation of the cutting implement drive train providing the advantageous cutting performance and function.

The pump 74 directs fluid to the blades of the turbine 78, which is connected by shafts 73 and 79 to output assembly 80. As the fluid from pump 74 engages the blades 77 of the turbine 78, the turbine spins causing the inner PTO shaft 79 to spin, which causes the cutting implement 40 to rotate. Otherwise stated, the directional change of fluid causes the turbine 78 to spin in the same direction as pump 74.

As the fluid energy is expended in the turbine 78 to rotate the output shaft 73 and therefore the cutting implement 40, two actions occur. First, the fluid changes direction due to energy loss. Second, the fluid must be re-directed toward the pump 74. Accordingly, the stator 63 is utilized to direct the hydraulic fluid toward the pump 74 while also improving efficiency. The stator 63 comprises an aggressive blade design that almost completely reverses the fluid direction. The stator 63 is positioned between the pump 74 and turbine 78 and may be locked from movement or may rotate in only a single direction by a one-way clutch. In addition, the stator 63 is axially aligned with the turbine and pump 78, 74. When the hydraulic fluid exits the turbine 78, the direction of the movement of the fluid is opposite to the direction of rotation of the power source 60 and pump 74. Were the fluid to contact the pump 74 with such motion, it would slow the pump and waste power. Thus the stator 63 is positioned between the pump 74 and turbine 78 to change the direction of fluid flow to that of the pump 74 and power source 60. The hydraulic fluid exits from the center of the turbine 78 in a direction which is opposite the pump rotation. The fluid next engages the stator 63 and the fluid direction is changed to move in the direction the pump 74 rotation. Because of the locked or one-way clutch configuration, the stator 63 cannot spin with the fluid coming from the turbine. Instead, the stator 63 changes the fluid direction so that it moves with the pump 74 rotation.

Various factors also may be varied and should be considered in order to affect the torque amplification of the torque converter. For example, the torque necessary to rotate the cutting implement 40, anticipated torque required during cutting, horsepower of the power source 60, clearance between the impeller and turbine, powerband and torque output of the power source 60, stator design, and diameter of the torque converter. It should be understood by one skilled in the art that the preceding list is not exhaustive should not be considered limiting, and that various other factors may be considered in order to properly size the torque converter 70 to obtain a desired torque amplification. Higher torque amplification causes large amounts of heat to be created by the shearing of the fluid within the torque converter 70. Thus an additional consideration is such heat extreme versus the amplification required. According to an exemplary embodiment, the torque amplification is generally less than 3:1 and may be, according to one embodiment about 1.9:1. However, such ratio should not be construed as limiting.

Referring now to FIGS. 9-12, various views of a power take-off output assembly are depicted. The output assembly 80 is depicted in an exploded perspective view to clearly depict each of the parts defining the assembly and in other views to visualize function. The output assembly 80 functions to engage or disengage the power take-off 15 of the tractor 12 in order to engage or disengage the cutting implement 40 from the torque converter 70 and power source 60. Connected to the torque converter 70 by an inner power take-off shaft 79 is an output assembly 80. The output assembly 80 has a power take-off 15 which extends from the front portion of the tractor 12 and provides power for the cutting implement 40 (FIG. 1) by way of a universal jointed drive shaft previously described. The output assembly 80 comprises an input shaft 82 having a first end 83 and a second end 84. The input shaft 82 has a plurality of splines at each end for engagement and torque transfer to components which are rotatably connected to the input shaft 82. At the first end 83 of the input shaft, is a threaded portion which engages a nut 85, adjacent the nut 85 is a washer 86 which is seated within a yolk 87. The yolk 87 comprises an inner bore which is splined to receive the splined first end 83 of the input shaft 82. At one end, the yolk 87 has a plate which connects to the inner PTO shaft 79 at the opposite side of the plate, the yolk 87 has a cylindrical portion having a bore wherein input shaft 82 may be positioned. The yolk 87 receives power input from the power source 60 and torque converter 70. A housing 88 is positioned over the input shaft 82 such that a portion of the cylindrical portion of the yolk 87 may be disposed between the inner diameter of the housing 88 and the outer diameter of the input shaft 82. The housing 88 is generally cylindrically shaped comprising an opening along an upper portion of the housing 88 and a flange 89 at one end thereof. The flange 89 has two sets of bolt holes, one set to connect the housing to the frame 14 and the other to connect the housing 88 to an adapter hub 69. Although not shown for clarity, the hub 69 and flange 89 are separated by the frame 14. The housing 88 comprises an inner bore wherein various components are seated between the yolk 87 and the inside bore of housing 88. First bearing 90 is positioned within the inside bore of the housing 88. The taper bearing 90 provides radial and thrust support for the input shaft 82 extending through the housing 88. Adjacent the bearing 90 is a spacer 92 which provides an axial distance between the first bearing 90 and a second bearing 94. Accordingly, when the input shaft 82 is positioned through the housing 88, the first end 83 passes through, and is supported by, the first and second bearings 90, 94 as well as the spacer 92. The input shaft 82 also comprises a collar which is seated against the inner race of bearings 90, 94. Adjacent the second taper bearing 94 within the housing 88 is a seal ring 95. The seal ring 95 is positioned adjacent the yolk 87 and seals the bearing compartment of the housing 88 while allowing the yolk 87 to rotate.

On the opposite end of the input shaft 82 is a second end 84 which is also splined to receive a shifter dog 62. The shifter dog includes an axially extending slot 63 extending about the circumference of the shifter dog 62. At one end of the shifter dog 62 is a plurality of teeth 64 having a plurality of gaps spaced between the teeth 64. At the opposite end of the shifter dog 62, an opening is splined to receive the complimentary spline design of the input shaft 82

Opposite the shifter dog 62 is an opposed dog 66 connected to a power take-off shaft 15 extending from a forward end of the opposed dog 66. The dog 66 comprises a plurality of teeth 65 facing the shifter dog 62 which are sized and spaced to fit between the plurality of teeth 64 of shifter dog 62. During operation, the shifter dog 62 moves axially to either engage or disengage the opposed dog 66. On the opposite side of the dog 66 and disposed over the PTO shaft 15 is at least one bearing 67 and a seal ring 68 engaged therewith. An adapter hub 69 is fastened to the frame 14 of the tractor 12 where the PTO shaft 15 passes through the frame 14. An O-ring may be disposed between the bending ring 69 and the frame 14 to inhibit particulate matter from contaminating portions of the output assembly 80.

Above the housing 88, an arm assembly is depicted comprising an arm 96 pivotally connected through a cover 97 to a shaft 98 and lever 99. The arm assembly extends through an opening 88a in housing 88. As the arm 96 is rotated, the arm pivots about the shaft 98 extending through cover 97 causing rotational displacement of the lever 99. This movement is provided by the offset nature of lever 99 relative to the shaft 98. As the lever 99 is displaced, a cam follower 100 moves with the lever arm 99 in a direction axially aligned with shaft 82 from a first position to a second position. The cam follower 100 moves within the groove 63 of shifter dog 62 in order to move the dog 62 axially toward or away from dog 66. In turn, this movement engages or disengages the opposed dog 66 causing engagement or disengagement of the PTO shaft 15. The rotation of arm 96 is controlled from the cab 19 by an operator and such control mechanism may include a cable connection, electromechanical, or the like.

In operation, the power source 60 of the tractor 12 is started to supply power to the tracks 16 as well as the implement 40. This function is performed from the cab 18 where the operator can control all of the functions of the deforestation apparatus 10. Once the power source 60 has been started and the engine is warmed, the operator may raise or lower the implement 40 to a desired height by controlling the hydraulic cylinders 32 and 34. The operator may also control the tilt of the cutting implement 40 by controlling the hydraulic cylinder assembly 36. Once the implement 40 is properly positioned relative to the tractor 12, the cutting operation may begin. In order to start such operation, power from the source 60 must be transferred to the implement 40. This occurs by operation within the cab 18 by the operator wherein the arm 96 is engaged and rotated in order to axially move the dogs 62 into engagement with the opposed dogs 66. By way of this engagement the power source 60 delivers power to the implement 40 for operation thereof. Once the implement 40 is engaged and being powered by the power source, the operator may then begin driving the deforestation apparatus 10 through the vegetated area. During this time, the power source 60 is generally driven at a substantially constant RPM. At such RPM, the implement will speed to a preselected rotational speed since the pump 74 and turbine 78 rotate at nearly equivalent speeds. Upon encountering of large logs and trees, the cutting implement 40 will slow its rotational speed or angular velocity. This results in the pump 74 rotating at a different speed than the turbine 78. When such speeds differ, the torque of the power source 60 is amplified causing the implement 40 to recover to its operating speed. Such recovery is faster than with prior art implements due to the torque amplification of the torque converter 70. Upon such amplification of torque, the implement 40 continues, for example, cutting where other implements either stall the engine or must be removed from the vegetation in order to recover. Accordingly, the torque amplification allows the device to clear heavier vegetation than prior art devices and perform such function at a faster rate of speed.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A deforestation apparatus, comprising:
    a track-driven skid steer having a forward end directed in a primary direction of travel, a rearward end, a cab including at least a window facing toward said forward end, a power source and a plurality of tracks, said cab at least partially disposed forward of said power source;
    a hydraulic torque converter connected to said power source and driving a mechanical power take-off shaft located at a front end of said skid steer;
    a cutting implement operably coupled to said mechanical power take-off shaft;
    wherein said torque converter amplifies torque to said mechanical power take-off when the cutting implement decreases in angular velocity relative to the power source.

2. The deforestation apparatus of claim 1 further comprising an output assembly.

3. The deforestation apparatus of claim 2, wherein said output assembly engages and disengages said power take-off shaft from said power source.

4. The deforestation apparatus of claim 2, wherein said output assembly engages and disengages said cutting implement from connection with said power source.

5. A land clearing apparatus, comprising:
    an implement;
    a track-type skid steer having a forward end for a primary direction of travel and a rearward end, a cab facing a forward end of said skid steer, said implement operably coupled to said forward end of said skid steer;
    a power source disposed in said skid steer, said power source disposed at least partially rearward of said cab;
    a hydraulic torque converter operably connected to said power source;
    a mechanical power take-off shaft operably connected to and driven by said torque converter and extending from a forward end of said skid steer, said mechanical power take-off releasably connected to said torque converter;
    said implement releasably driven by said torque converter and said mechanical power take-off shaft;
    wherein said torque converter amplifies the torque of said power source when the speed of said implement decreases relative to said power source.

6. The land clearing device of claim 5, said releasable connection provided by an output assembly.

7. The land clearing device of claim 5, said output assembly having an axially slidable dog to engage said torque converter and said power take-off shaft.

8. The land clearing device of claim 5, said implement coupled to said power take-off shaft by a drive shaft.

9. A deforestation apparatus, comprising:
    a skid-steer tractor having a cab, a forward end directed in a primary direction of travel, a rearward end and a power source, said power source positioned at least in part rearwardly of said cab;
    a hydraulic torque converter mechanically connected to said power source;
    said torque converter mechanically connected to an output assembly;
    said output assembly including a power take-off shaft extending from a forward end of said tractor;
    said power take-off shaft operably connected to a cutting implement;
    wherein said torque converter amplifies the torque output of the power source to the power take-off shaft allowing faster recovery of said cutting implement.

10. The deforestation apparatus of claim 9, said torque converter providing a fluid coupling between said cutting implement and said power source.

11. The deforestation apparatus of claim 9, said output assembly including an axially slidable dog which engages and disengages said power take-off shaft.

12. The deforestation apparatus of claim 11 further comprising a lever arm assembly which moves said slidable dog.

13. The deforestation apparatus of claim 11 further comprising an opposed dog which receives said slidable dog, said opposed dog connected to said power take-off shaft.

14. The deforestation apparatus of claim 12, said torque converter having a flex-plate connecting said power source to said torque converter.

15. The deforestation apparatus of claim 9 further comprising an inner power take-off shaft connecting said torque converter and said output assembly.

16. The deforestation apparatus of claim 15, said inner power take-off shaft connected to said output assembly by a yolk.

17. A land clearing machine, comprising:
- a track-driven tractor having a forward end indicative of a primary travel direction, a rearward end, a cab facing said forward end and a drive line;
- said cab disposed at least partially forward of said power source;
- a mechanical power take-off shaft operably connected to said drive line and extending from said forward end of said tractor;
- a hydraulic torque converter positioned within said drive line between said power take-off and a power source, said hydraulic torque converter driving said mechanical power take-off shaft;
- said power take-off releasably connected to said drive line by an output assembly.

* * * * *